United States Patent
Heinkel et al.

(10) Patent No.: US 7,183,819 B2
(45) Date of Patent: Feb. 27, 2007

(54) METHOD AND CIRCUIT CONFIGURATION FOR SYNCHRONOUS RESETTING OF A MULTIPLE CLOCK DOMAIN CIRCUIT

(75) Inventors: Ulrich Heinkel, Buckenhof (DE); Wolfgang Rupprecht, Igensdorf (DE); Christoph Smalla, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 72 days.

(21) Appl. No.: 11/027,906

(22) Filed: Dec. 30, 2004

(65) Prior Publication Data

US 2006/0145738 A1    Jul. 6, 2006

(51) Int. Cl.
*H03L 7/00* (2006.01)

(52) U.S. Cl. .................................... 327/141; 327/144
(58) Field of Classification Search ............... 327/141, 327/144, 145, 202, 211, 212, 217, 218; 714/726
See application file for complete search history.

(56) References Cited

U.S. PATENT DOCUMENTS 6,606,705 B1 *  8/2003  Volk ........................... 713/100
6,696,854 B2 *  2/2004  Momtaz et al. ............... 326/37

* cited by examiner

*Primary Examiner*—Linh My Nguyen

(57) ABSTRACT

A method and circuit configuration for synchronous resetting of an multiple clock domain circuit such as an Application Specific Integrated Circuit (ASIC) combine an asynchronous reset signal with a functional signal using a clocked reset tree of synchronous logic elements.

21 Claims, 3 Drawing Sheets

METHOD AND CIRCUIT CONFIGURATION FOR SYNCHRONOUS RESETTING OF A MULTIPLE CLOCK DOMAIN CIRCUIT

FIELD OF THE INVENTION

The invention relates to integrated electronic circuits and, more particularly, to multiple clock domain circuits such as Application Specific Integrated Circuits (ASICs).

BACKGROUND OF THE INVENTION

Application Specific Integrated Circuits (ASICs) are commonly used to perform a variety of functions in electronically controlled devices and systems. In operation, ASICs should be resetable to a defined state (e.g., initial state, and the like).

Conventionally, resetting an ASIC to the defined state is accomplished by generating a reset signal and applying that signal to reset pins of the storage cells of the ASIC, such as D-type flip-flops, and the like.

However, in large ASICs, as well as the ASICs having multiple clock domains, loading conditions and propagation delays associated with the reset signal may result in asynchronous resetting of the storage cells, thus causing setup/hold time violations and failures within the ASIC.

SUMMARY OF THE INVENTION

Various deficiencies of the prior art are addressed by the present invention of a method and circuit configuration for providing a synchronous reset in ASICs, including the ASICs having multiple clock domains.

One aspect of the invention is a method for synchronous resetting an ASIC by combining an asynchronous reset signal with a functional signal and using a clocked reset tree of synchronous logic devices synchronized by clock signals of the respective clock domains of the ASIC.

In other embodiments of the invention are disclosed circuit configurations and apparatuses suitable for executing the inventive method.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

It is to be noted, however, that the appended drawings illustrate only exemplary embodiments of this invention and are therefore not to be considered limiting of its scope, for the invention may admit to other equally effective embodiments.

DETAILED DESCRIPTION OF THE INVENTION

The present invention will be generally described within the context of the ASICs. It will be appreciated by those skilled in the art that the invention may also be utilized within the context of other integrated circuits, such as field programmable gate arrays (FPGAs), microprocessor-based integrated circuits, and the like.

While the present invention is primarily described herein within the context of a particular type of synchronous logic device (i.e., a device having a clock input and at least one data input, such as a D-type flip-flop), it will be appreciated that the invention is applicable to other synchronous logic devices such as JK flip-flops, T-flip-flops, shift registers and the like. Therefore, while the figures and description refers primarily to a specific synchronous logic device, those skilled in the art and informed by the teachings of the present invention will appreciate that the various embodiments may be employed within the context of these and other synchronous logic devices.

Hereafter, similar components and devices are identified using the same numeric references, except that the suffixes may be added, when appropriate, to differentiate between the specific components and devices.

Figure 1:
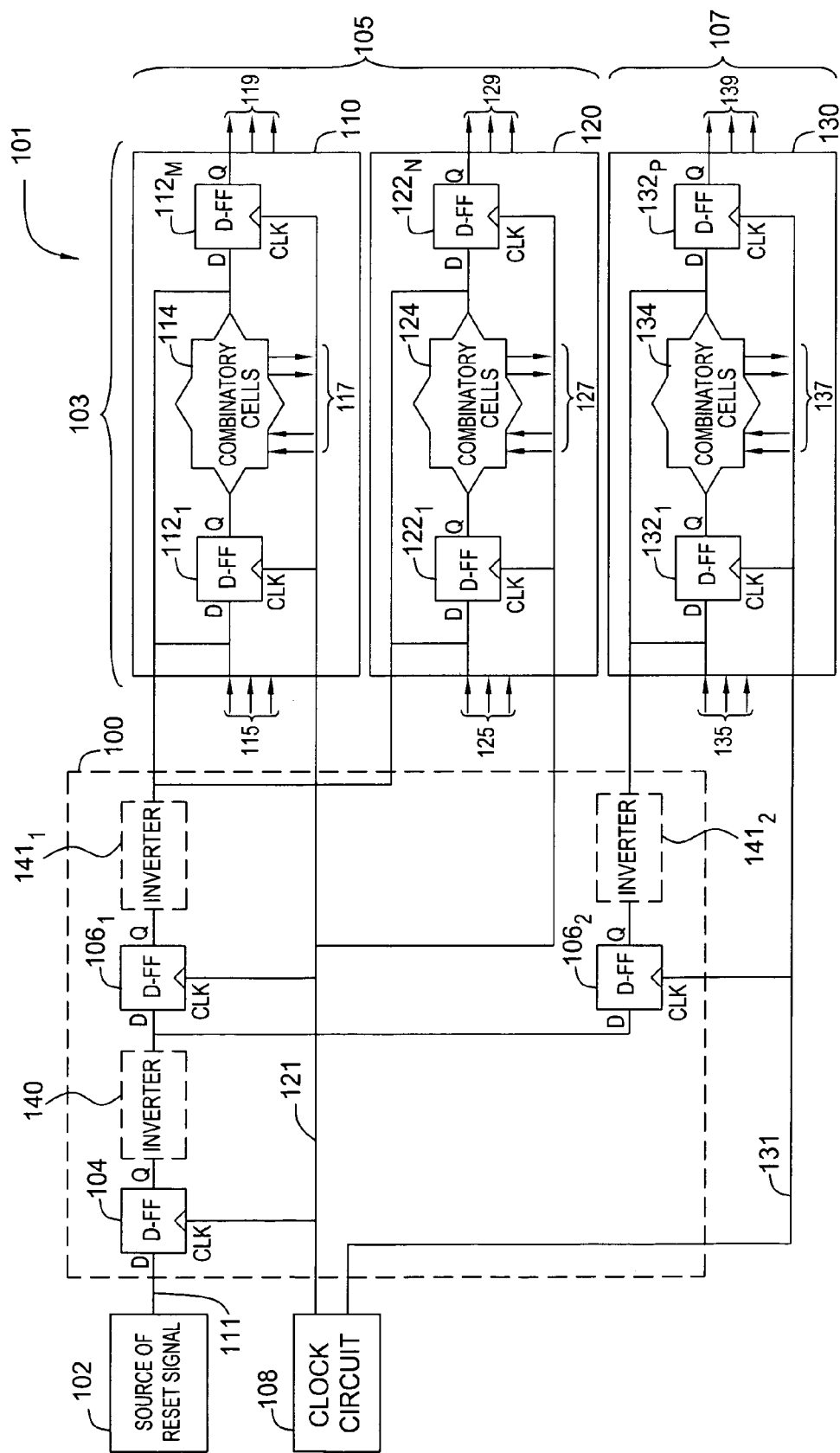
FIG. 1 depicts a high-level schematic diagram of a circuit configuration for synchronous resetting an ASIC suitable for use with the present invention.
Figure 2:
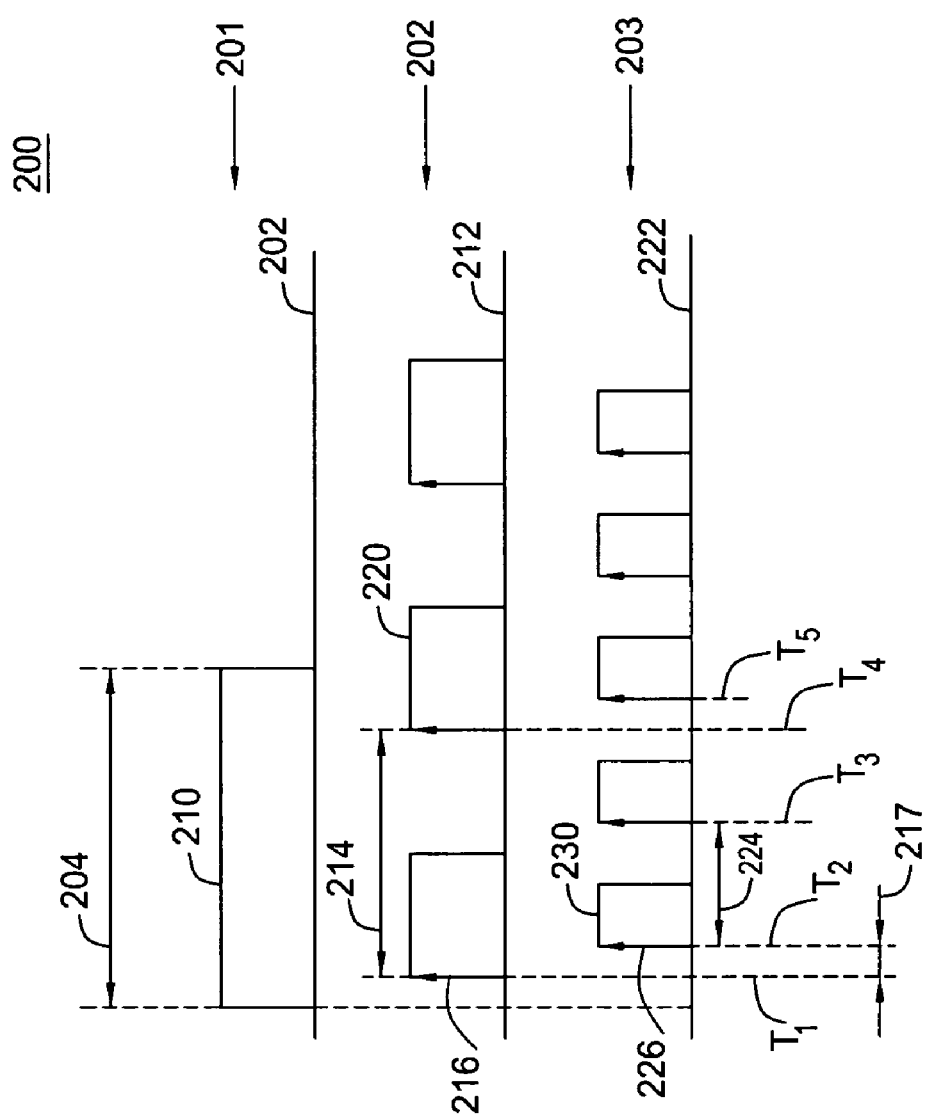
FIG. 2 depicts a series of exemplary timing diagrams of reset and clock signals in the circuit configuration of FIG. 1.

FIG. 1 depicts a high-level schematic diagram of a circuit configuration 100 for synchronous resetting of an exemplary ASIC 101 suitable for use with the present invention. FIG. 2 depicts a series 200 of exemplary timing diagrams of reset and clock signals in the circuit configuration of FIG. 1. For better understanding of this embodiment of the invention, the reader should refer simultaneously to FIGS. 1 and 2.

Referring to FIG. 1, the ASIC 101 comprises a source 102 of a reset signal 210 (shown in FIG. 2), a clock circuit 108, a plurality 103 of functional units (illustratively, functional units 110, 120, and 130 are shown), and the circuit configuration 100. Herein, a functional unit is defined as a portion of the ASIC that belongs to the same clock domain, wherein the term "clock domain" refers to particular circuits or circuit portions where individual components are synchronized using the same clock signal.

In the depicted embodiment, the ASIC 101 illustratively comprises clock domains 105 and 107. Arbitrarily, the clock domain 105 includes the functional units 110 and 120, and the clock domain 107 includes the functional unit 130.

Each functional unit comprises a plurality of synchronous logic storage cells, such as D-type flip-flops (D-FFs), T-type flip-flops (T-FFs), and the like, and a plurality of combinatory logic cells. The storage cells and combinatory logic cells are interconnected (not shown) internally (i.e., within the functional unit), as well as with the ones in other functional units in a manner that facilitates execution of a pre-determined function by the corresponding functional unit.

In the functional units 110, 120, and 130, the storage cells and the combinatory logic cells are denoted using the numerals 112, 122, and 132 and the numerals 114, 124, and 134. Correspondingly, the internal interconnections and the external signals are denoted with the numerals 117, 127, and 137 and the numerals 115, 125, and 135, and the outputs are denoted with the numerals 119, 129, and 139. Suffixes M, N, and P relate to a number of the storage cells in each of the functional units 110,120, and 130 and M, N, P $\geq$ 1. Data inputs, outputs, and clock inputs of the D-FFs are denoted "D", "Q", and "CLK", respectively. In one embodiment, the functional units 110,120, and 130 include D-FFs without reset inputs or having the reset inputs set to an inactive state.

The clock circuit 108 is a generator of clock signals 220 and 230 (shown in FIG. 2) that are used to synchronize components of the functional units of the ASIC 101.

Referring to FIG. 2, a graph 201 depicts a reset signal 210 versus time (x-axis 202), a graph 202 depicts a sequence of cycles 214 of the slowest clock signal 220 of the ASIC 101 versus time (x-axis 212), and a graph 203 depicts a sequence of cycles 224 of another clock signal 230 versus time (x-axis 222).

The clock signal 230 and other clock signals (not shown) of the ASIC 101 may be either independent signals or harmonics of the slowest clock signal 220 that maintain a fixed timing relationship with the signal 220, as well as with one another. In the depicted embodiment, the clock signal 230 arbitrarily has, relative to the clock signal 220, a time shift 217. In another embodiment (not shown), the clock signals 220 and 230 may be edge-synchronized.

Conventionally, amplitudes of the signals 210, 220, and 230 correspond to the amplitudes of respective logic signals (e.g., logic "1" and logic "0") in the ASIC 101. In the depicted embodiment, the reset signal 210 has an amplitude corresponding to the logic "1". In an alternate embodiment, the amplitude of the reset signal 210 may correspond to the logic "0". Referring to FIG. 1, the reset signal 210 and the clock signals 220 and 230 are illustratively associated with buses 111, 121 and 131, respectively.

The source 102 of the reset signal 210 is generally implemented in a form of a controlled generator of a pulse signal of pre-determined duration. In the ASIC 101, a duration 204 of the reset signal 210 is substantially equal to or greater than a period 214 of the slowest clock signal (i.e., clock signal 220) used in the ASIC. With respect to the clock signals 220 and 230, the reset signal 210 may be generated at a randomly selected moment of time.

The circuit configuration 100 generally comprises a clocked reset tree that is formed of D-type flip-flops (D-FFs) and where each branch corresponds to a specific clock domain of the ASIC 101. In the depicted embodiment, the circuit configuration 100 comprises the clocked reset tree including a first D-FF 104 and two branched D-FFs $106_1$ and $106_2$, where the D-FF $106_1$ is associated with the clock domain 105 and the D-FF $106_2$ is associated with the clock domain 107. In one embodiment, the first D-FF 104 and the branched D-FFs 106 have no reset inputs or have the reset inputs set to an inactive state.

A data input and a clock input of the first D-FF 104 are coupled to an output of the source 102 (i.e., to the bus 111) and to the slowest clock signal 220 (i.e., to the bus 121) of the ASIC 101, respectively, and an output of the first D-FF 104 is coupled to data inputs of the D-FFs $106_1$ and $106_2$.

Assuming that the functional units 110 and 120 of the clock domain 105 are associated with the slowest clock signal 220 (i.e., components of the units 110 and 120 are synchronized using the clock signal 220), a clock input of the D-FF $106_1$ is coupled to the bus 121, while an output of the D-FF $106_1$ is coupled to data inputs of the storage cells 112 and 122.

Correspondingly, assuming that the functional unit 130 of the clock domain 107 is associated with the clock signal 230 (i.e., components of the unit 130 are synchronized using the clock signal 230), a clock input and an output of the D-FF $106_2$ are coupled to the bus 131 and to data inputs of the storage cells 132, respectively.

When a number of the storage cells in a clock domain exceeds loading capabilities of a branched D-FF, two one more branched D-FF may be coupled in parallel (not shown). Then, each such D-FF may be coupled to a portion of the storage cells in that clock domain, thus meeting loading requirements for the branched D-FF.

The storage cells 112, 122, and 132 are edge-triggered devices and, illustratively, the positive edge-triggered devices. Data outputs of the storage cells 112 and 122 attain a value of a signal at a data input of the respective cell when the clock signal 220 changes from logic "0" to logic "1", as illustrated in FIG. 2 using arrows 216. Similarly, the data outputs of the storage cells 132 attain a value of a signal at a data input of the respective cell when the clock signal 230 changes from logic "0" to logic "1", as illustrated using arrows 226.

Referring to FIG. 2, in operation, , data outputs of the first D-FF 104 and the D-FF $106_1$ attain the logic level of the reset signal 210 (i.e., logic "1") at moments $T_1$ and $T_4$, respectively. Consequently, one clock period 214 later, at a moment $T_5$, the same logic level "1" is attained by the D-FFs 112 (functional unit 110) and the D-FFs 122 (functional unit 120), thus facilitating synchronous resetting of the flip-flops in the clock domain 105.

Similarly, at a moment $T_3$, a data output of the D-FF $106_2$ and, at a moment $T_5$, data outputs of the D-FFs 132 (functional unit 130) attain the logic level of the reset signal 210, thus facilitating synchronous resetting of the flip-flops in the clock domain 107. When the duration 204 of the reset signal 210 exceeds a period of the corresponding clock signal, as depicted in FIG. 2, synchronous resetting of the flip-flops in the ASIC 101 is repeated (e.g., at moments $T_3$ and $T_4$ in the clock domain 107 and 105, respectively).

In another embodiment, when specific flip-flops should be reset to a state that is different from the state of the reset signal 210, data inputs of such flip-flops may be coupled to the output of the respective branched D-FF via an inverter (illustratively, via inverter $141_1$ for D-FF $106_1$ or inverter $141_2$ for D-FF $106_2$). Similarly, in yet another embodiment, when all flip-flops of the functional unit (e.g., unit 130) or the entire clock domain (e.g., domain 105) should be reset to such a different state, a data input of the corresponding D-FF (i.e., D-FF $106_2$ or D-FF $106_1$, respectively) may be coupled to the data output of the first D-FF 104 via an inverter 140.

In the ASIC where a plurality of clock signals includes more than two clock signals, the corresponding clock domains may be synchronously reset by adding additional branches (not shown) to the clocked reset tree of the circuit configuration 100. Specifically, such branches may be coupled to the first D-FF 104 or, alternatively, to the branched D-FFs 106 in the same manner as, in the depicted embodiment, the D-FFs 106 are coupled to the first D-FF 104.

Figure 3:
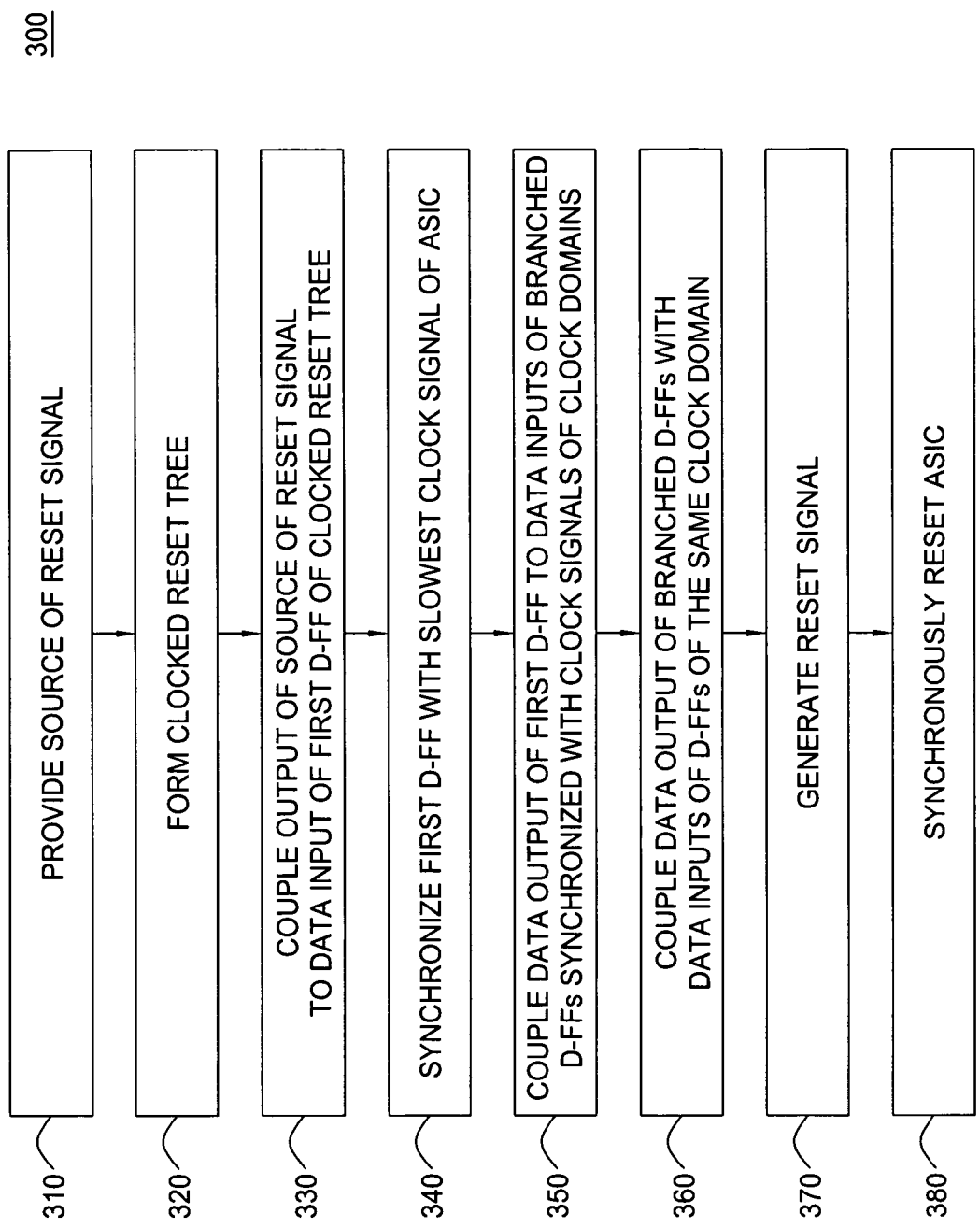
FIG. 3 depicts a flow diagram of a method for synchronous resetting an ASIC according to one embodiment of the present invention.

FIG. 3 depicts a flow diagram of a method for synchronous resetting an ASIC using the circuit configuration 100 of FIG. 1 according to one embodiment of the present invention. Specifically, the method of FIG. 3 contemplates several circuit functions suitable for use in accordance with the present invention.

The method of FIG. 3 starts at step 310, where a source of a reset signal (i.e., source 102) of the ASIC (e.g., ASIC 101) is provided. The ASIC may comprise multiple clock domains, each clock domain including one or more storage cells, as well as combinatory logic. In one embodiment, the storage cells are implemented in a form of D-type flip-flops, or D-FFs.

At step 320, the circuit configuration 100 comprising a clocked reset tree is provided. The clocked reset tree includes a first D-FF (e. g., D-FF 104) and a plurality of blanched D-FFs (e. g., D-FFs 106) associated with particular clock domains of the ASIC.

At step 330, an output of a source of a reset signal is coupled to a data input of a first D-FF of the clocked reset tree of the circuit configuration 100. A duration of the reset signal is selected to exceed a period of the slowest clock signal (e.g., clock signal 220) of the ASIC.

At step 340, the slowest clock signal 220 of the ASIC is applied to a clock input of the first D-FF of the clocked reset tree. Also, any other clock may be applied to the first D-FF, as long as the applied reset signal is long enough (longer than one slowest clock period).

At step 350, data inputs of the branched D-FFs are coupled to the output of the first D-FF and the branched D-FFs are synchronized using clock signals of the respective clock domains of the ASIC.

At step 360, outputs of the branched D-FFs are coupled to data inputs of the storage cells of the functional units of the respective clock domains.

At step 370, a reset signal (i.e., signal 210) is generated (e.g., by the source 102). In one embodiment, the reset signal has duration equal to or exceeding the period of the clock signal used to synchronize the first D-FF of the clocked reset tree.

At step 380, the circuit configuration 100 synchronously resets clock domains of the ASIC 101. Because the start of the reset does not depend on the clock frequency, but on the phase relations, it is not determinable, which clock domain is reset first.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for synchronous resetting of a multiple clock domain integrated circuit, comprising:
    forming a clocked reset tree comprising a first synchronous logic element and at least one branched synchronous logic element, each branched synchronous logic element being synchronized using a crock signal of a respective clock domain of the integrated circuit;
    synchronizing the first synchronous logic element using a first clock signal of the integrated circuit;
    coupling an output of the first synchronous logic element to a data input of the at least one branched synchronous logic element; and
    coupling an output of each of the at least one branched synchronous logic element with data inputs of synchronous logic elements of the respective clock domain;
    the first and the at least one branched synchronous logic elements being reset in response to a reset signal applied to a data input of said first synchronous logic element.

2. The method of claim 1 wherein each synchronous logic element is a device having a clock input and at least one data input.

3. The method of claim 2 wherein each synchronous logic element is selected from the group consisting of a D-type flip-flop (D-FF). T-type flip-flop (T-FF), and a JK flip-flop.

4. The method of claim 1 wherein duration of the reset signal is substantially equal to or greater than a period of the slowest clock signal of the clock domain.

5. The method of claim 1 wherein said synchronous logic elements are edge-triggered devices.

6. The method of claim 1 wherein a data input of said branched synchronous logic element is coupled via an inverter.

7. The method of claim 1 wherein a data input of said synchronous logic element of the clock domain is coupled via an inverter.

8. A circuit configuration for synchronous resetting of a multiple clock domain integrated circuit, comprising:
    a clocked reset tree comprising a first synchronous logic element, the first synchronous logic element being synchronized using a first clock signal of the integrated circuit; and
    at least one branched synchronous logic element, each branched synchronous logic element being synchronized using a clock signal of a respective clock domain of the integrated circuit;
    wherein an output of the first synchronous logic element is coupled to a data input of the at least one branched synchronous logic element and an output of each of the at least one branched synchronous logic element is coupled with data inputs of synchronous logic elements of the respective dock domain, the first and the at least one branched synchronous logic elements being reset in response to a reset signal applied to a data input of said first synchronous logic element.

9. The circuit configuration of claim 8 wherein each synchronous logic element is a device having a clock input and at least one data input.

10. The circuit configuration of claim 9 wherein each synchronous logic element is selected from the group consisting of a D-type flip-flop (D-FF), T-type flip-flop (T-FF), and a JK flip-flop.

11. The circuit configuration of claim 8 wherein duration of the reset signal is substantially equal to or greater than a period of the slowest clock signal.

12. The circuit configuration of claim 8 wherein said synchronous logic elements are edge-triggered devices.

13. The circuit configuration of claim 8 wherein a data input of said branched synchronous logic element is coupled via an inverter.

14. The circuit configuration of claim 8 wherein a data input of said synchronous logic element of the clock domain is coupled via an inverter.

15. A multiple clock domain integrated circuit, comprising:
    at least one clock domain;
    a source of a reset signal; and
    a synchronous resetting circuit, comprising:
    a clocked reset tree comprising a first synchronous logic element, the first synchronous logic element being synchronized using a first clock signal of the integrated circuit; and
    at least one branched synchronous logic element, each branched synchronous logic element being synchronized using a clock signal of a respective clock domain of the integrated circuit;
    wherein an output of the first synchronous logic element is coupled to a data input of the at least one branched Synchronous logic element and an output of each of the at least one branched synchronous logic element is coupled with data inputs of synchronous logic elements of the respective clock domain, the first and the at least one branched synchronous logic elements being reset in response to a reset signal applied to a data input of said first synchronous logic element.

16. The circuit of claim 15 wherein each synchronous logic element is device having a clock input and at least one data input.

17. The circuit of claim 16 wherein each synchronous logic element is selected from the group consisting of a D-type flip-flop (D-FF). T-type flip-flop (T-FF), and a JK flip-flop.

18. The circuit of claim 15 wherein duration of the reset signal is substantially equal to or greater than a period of the slowest clock signal.

19. The circuit of claim 15 wherein said synchronous logic elements are edge-triggered devices.

20. The circuit of claim 15 wherein a data input of said branched synchronous logic element is coupled via an inverter.

21. The circuit of claim 15 wherein a data input of said synchronous logic element of the clock domain is coupled via an inverter.

* * * * *